Dec. 22, 1964 F. R. HOLT 3,162,729

MODULATION SYSTEM FOR MULTIPLEX FREQUENCY-MODULATION SIGNAL TRANSMITTER

Filed Nov. 14, 1960 2 Sheets-Sheet 1

INVENTOR.
Francis R. Holt
BY
Eugene M. Whitacre
ATTORNEY

Dec. 22, 1964 F. R. HOLT 3,162,729

MODULATION SYSTEM FOR MULTIPLEX FREQUENCY-MODULATION SIGNAL TRANSMITTER

Filed Nov. 14, 1960 2 Sheets-Sheet 2

INVENTOR.
Francis R. Holt
BY
Eugene M. Whitacre
ATTORNEY

United States Patent Office 3,162,729

Patented Dec. 22, 1964

3,162,729

MODULATION SYSTEM FOR MULTIPLEX FREQUENCY - MODULATION SIGNAL TRANSMITTER

Francis R. Holt, Willow Grove, Pa., assignor to Radio Corporation of America, a corporation of Delaware Filed Nov. 14, 1960, Ser. No. 69,069
11 Claims. (Cl. 179—15)

The present invention relates to multiplex frequency-modulation systems for modulated-signal transmission and reception, and more particularly to signal-transmitter means for such systems and signal-modulation means therefor.

As is known, a multiplex frequency-modulation system utilizes a main carrier wave which is frequency modulated by a first or main channel signal and by one or more subcarrier waves that may be either amplitude or frequency modulated by a second signal. Generally the subcarrier signal is frequency modulated in order to improve the signal-to-noise ratio of the subcarrier or second signal at the receiver. The present invention is particularly adapted to multiplex frequency-modulation signal transmission systems in which both the main and subcarrier signals are frequency modulated.

Even with frequency modulation of the subcarrier, a multiplex frequency-modulation system has certain disadvantages which may be considered to be of importance. First, in order to accommodate the subcarrier wave and yet retain the transmitted signal within a given band of frequencies, the maximum deviation of the main carrier wave by the main program or modulation signal must be reduced, usually by 3 db, thus reducing the service area of the station concerned. Second, the signal-to-noise ratio of the subcarrier or second program signal at the receiver is, in general, not as good as that of the main program or first signal.

It is, therefore, an object of this invention to provide an improved modulation system for FM-multiplex signal transmission, wherein the mean power transmitted on the subcarrier wave can be increased without causing overmodulation and thus improve the signal-to-noise ratio of the second signal at the receiver.

It is a further object of this invention, therefore, to provide an improved modulation system for a multiplex frequency-modulation transmitter using a frequency-modulated sub-carrier wave which permits a larger maximum deviation of the carrier wave by the main channel signal than heretofore and yet maintains the resultant multiplexed signal within a prescribed frequency range.

It is also a further object of the invention to provide an improved FM-multiplex modulation system which is adapted for stereophonic signal transmission and which provides an improved signal-to-noise ratio for both the main and second channel signals at the receiver.

Such a system permits the subcarrier signal to increase in amplitude and strength and thereby to aid in reducing noise effects in reception, especially during quiet passages, that is, periods of low modulation, of the main carrier or channel. This is of importance because the subcarrier channel or a multiplex frequency-modulation system is generally worse for noise effects at the receiver than the main channel. Furthermore only slight restriction of the main channel modulation is required to permit transmission of the subcarrier signal. In the present system, therefore, the subcarrier signal can be transmitted without appreciably restricting the main channel modulation.

In accordance with the invention, the amplitude of the subcarrier is controlled by a function, such as amplitude variation, derived from the main channel modulation signal prior to its application for modulating the main carrier, and preferably after pre-emphasis. The amplitude-modulated subcarrier signal is added to the main-channel modulating signal and the combined or composite modulating signal is then used to frequency modulate the main carrier-wave.

The sub-carrier signal is amplitude modulated by a function of the main program or modulation signal, as above pointed out, and this function can follow either instantaneous changes in the main channel modulation or changes in the level or average amplitude thereof. This system not only reduces the spread of the sidebands around the sub-carrier signal so that interference with other sub-carriers or the main channel is greatly reduced or prevented, but provides a signal-to-noise ratio which is highly improved under operating conditions, and particularly on the sub-carrier signal when the main carrier signal is quiet, or at substantially-low modulation levels. Thus the system is particularly adapted for use in stereophonic multiplex frequency-modulation signal transmission systems.

The invention will, however, be further understood from the following description, when considered in connection with the accompanying drawings, and its scope is pointed out in the appended claims, In the drawings, FIGURE 1 is a schematic circuit diagram of a multiplex frequency-modulation transmitter provided with a modulation system embodying the invention;

Figure 1:
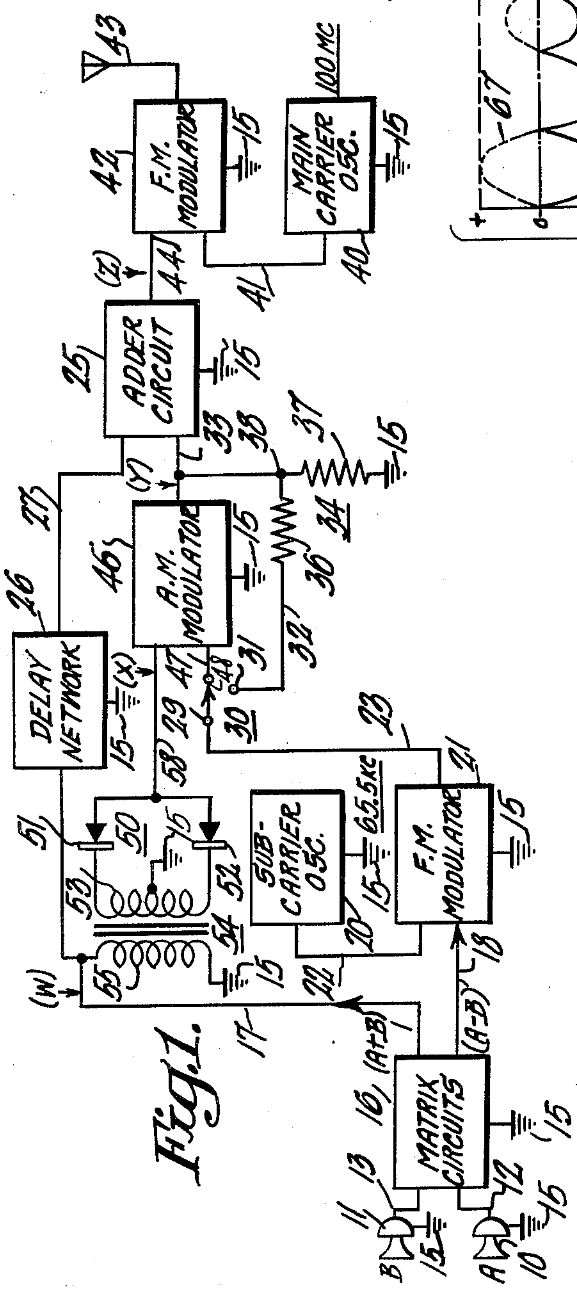

Referring to FIGURE 1, the multiplex frequency-modulation transmitter is arranged to operate with one main-carrier signal, which by way of example may be 100 mc., and one subcarrier signal, which by way of example may be 65.5 kc. The transmitter, also by way of example, is further arranged for operation in a two-channel stereophonic signal transmission system wherein two stereophonically-related audio-frequency or sound signals, such as stereophonic Channel A and Channel B signals, are derived from any suitable pair of sources, such as two spaced left and right studio microphones 10 and 11, respectively. These, or like sound signal sources, are connected through input circuit leads 12 and 13 respectively, and common circuit ground means 15 for the system, to suitable matrixing circuits 16 for producing a main-channel modulating $(A+B)$ signal at an output circuit lead 17 with respect to said common ground, and a second or multiplex-channel modulating $(A-B)$ signal at an output circuit lead 18 with respect to said common ground. In a complete system of this type, as is understood, pre-emphasis may be added. In the present example this would be provided in connection with the input circuits preceding, or the output circuits following, the matrixing operation.

The sub-carrier signal is provided by a suitable source of oscillations such as a sub-carrier oscillator 20, which for example may have a frequency of 65.5 kilocycles (kc.) and is frequency modulated by frequency-modulator means 21 with which the oscillator 20 is connected through a circuit lead 22 and system ground. The output circuit lead 18 for the $(A-B)$ signal is also connected to the modulator means 21 for applying frequency modulation to the sub-carrier signal, and the modulated output signal is derived from the modulator means 21 through a circuit comprising system ground and an output lead 23.

The main channel modulating (A+B) signal at the output circuit lead 17 is applied to suitable adder circuits 25 through a delay network 26 and a circuit lead 27, with a common ground return connection. The output circuit 23 from the subcarrier FM modulator means 21 is connected to the movable contact 29 of the two-point switch 30, one contact 31 of which is connected to the adder circuits 25 through a connection lead 32–33 and voltage divider means 34. The latter, by way of example, comprises a pair of series resistors 36 and 37 connected between the lead 32 and the system ground 15 with an intermediate terminal 38 connected to the lead 33 and thence to the adder circuits 25. This circuit arrangement provides for applying the frequency-modulated subcarrier signal at a predetermined reduced amplitude directly to the adder circuits 25 when the switch 30 is operated to close the contact 29 with the contact 31. This latter circuit connection provides for adding the main channel modulating (A+B) audio-frequency signal to the modulated 65.5 kc. subcarrier signal at the added circuits 25 for normal multiplex operation.

The main carrier-wave for the multiplex frequency-modulation signal transmitter is provided by a suitable source of oscillations, such as a main-carrier wave oscillator 40, which is connected through system ground and an output circuit lead 41 with the main frequency-modulator means 42 of the system for application of the modulated carrier wave to suitable antenna means 43 connected therewith as indicated. The main carrier wave is frequency modulated in the modulator means 42 by the (A+B) modulation signal and the (A−B) frequency-modulated subcarrier signal. In the present example these provide a composite modulation signal in the circuits 25 which are connected through system ground and an output circuit lead 44 with the frequency modulator 42.

In accordance with the invention, the amplitude of the subcarrier signal is controlled by a function, such as amplitude variation, derived from the main-channel modulation signal prior to its application for modulating the main carrier wave in the FM modulator 42. To this end, therefore, amplitude-modulation or AM modulator means 46 is interposed in circuit between the FM modulator 21 and the main carrier-wave modulator 42 and in the present example preceding the adder circuits 25. The AM-modulator means is provided with a subcarrier signal input circuit lead 47 which is connected with a second contact 48 of the switch 30, with which the contact arm 29 is normally connected as shown, whereby the circuit lead 23 is thereby normally connected with the circuit lead 47. The AM modulator 46 is provided with common ground circuit return means for the system as indicated. With these connections, the AM modulator is in circuit for amplitude modulating the subcarrier signal provided at the output circuit 23 from the FM modulator 21.

The signal used to amplitude modulate the subcarrier signal in the AM modulator 46 may be derived from the main channel modulating signal by any suitable means, such as a full-wave rectifier circuit 50. In the present example this comprises a pair of diode rectifiers 51 and 52 connected with the end terminals of a center-tapped secondary winding 53 of an audio-frequency coupling transformer 54 having the primary winding 55 thereof connected between the modulating (A+B) signal output circuit lead 17 and ground 15 for the system. The center tap of the secondary winding 53 is also grounded as indicated, whereby full-wave rectification for the (A+B) signal is provided. The control signal output circuit comprises system ground and a circuit lead 58 which is connected between the diode rectifiers 51 and 52 and the AM modulator 46. The rectifier load circuit is included in the AM modulator 46, and completes a direct current path between the lead 58 and ground.

With this circuit arrangement, the frequency-modulated subcarrier signal from the modulator 21 is amplitude modulated or controlled in amplitude in the AM modulator 46, by the rectified main channel (A+B) modulating signal, and the composite amplitude and frequency modulated signal is fed to the FM modulator 42 for the frequency modulation of the main carrier-wave or signal derived from the oscillator 40. This system thus provides for amplitude modulating, or controlling the amplitude of, the subcarrier wave or signal, and the FM modulation on it, by a function such as amplitude variation of the program signal in the main channel. This can, as in the present example, be the rectified (A+B) main modulation signal and can follow the instantaneous changes in the amplitude thereof. In this way the mean power transmitted on the subcarrier is greatly increased, thereby improving the signal-to-noise ratio, especially during quiet passages of the main channel modulation.

Figure 2:
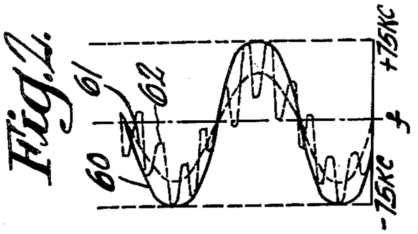
FIGURES 2, 3 and 4 are graphs showing curves illustrating certain operating features and characteristics of the modulation system shown in FIGURE 1.
Figure 4:
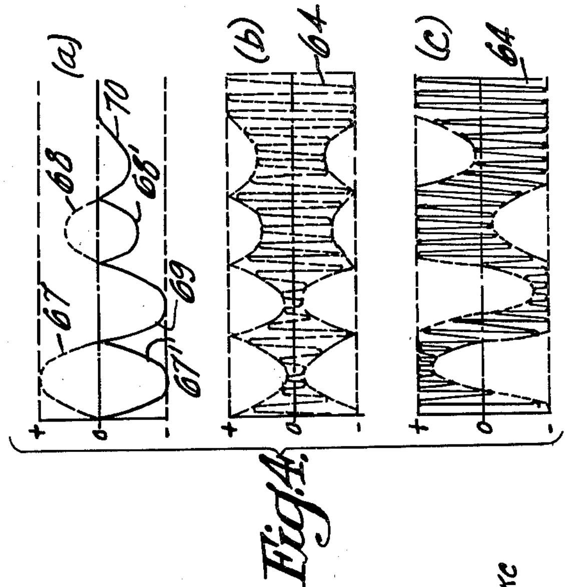
Figure 3:
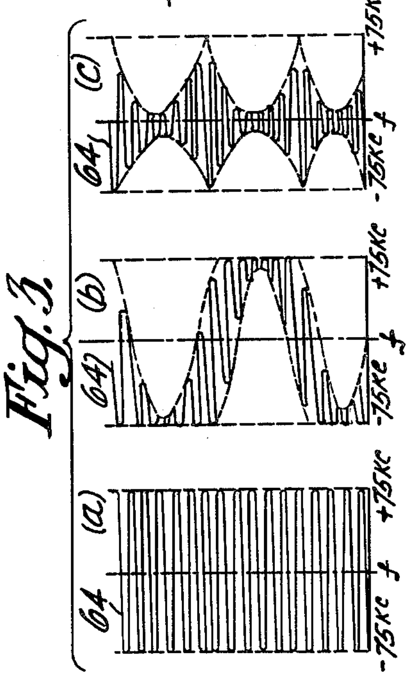

For a further understanding of the operation of the improved modulation system of FIGURE 1 attention is now directed to the graphs shown in FIGURES 2, 3 and 4. Considering the graph of FIGURE 2, the sinusoidal solid-line curve 60 represents the main-channel frequency deviation wtih respect to the center frequency (f) thereof, which in the present example, is 100 mc. as provided by the oscillator 40. The full frequency deviation of ±75 kc. is indicated. This deviation must ordinarily be substantially reduced when the subcarrier wave or signal is added, as indicated by the dash-line sinusoidal curve 61 which carries thereon the subcarrier signal deviation, indicated by the dotted curve 62. The curves 61 and 62 represent the reduced main-channel signal and the subcarrier deviation as would normally be provided with the switch 30 positioned to provide a connection between the contact arm 29 and the fixed contact 31, for normal multiplex operation. Thus to accommodate the subcarrier signal, the permissible deviation of the main carrier wave by the main program signal must be reduced, usually by 3 db as hereinbefore mentioned, and thus reduce the signal coverage or service area of the transmitter or broadcast station concerned. Furthermore, as before mentioned, the signal-to-noise ratio of the subcarrier signal or secondary program is not as good as that of the principal program.

Referring to FIGURE 3 along with FIGURE 2, the curve 64 in FIGURE 3a represents the subcarrier signal only, in its deviation control of the main carrier with respect to the mean or center frequency (f) when there is no main channel (A+B) modulation.

In the system of the present invention, with modulation on both the main and subcarrier waves, the frequency deviation of the main carrier wave from the mean frequency (f), between the prescribed limits of ±75 kc., is substantially as represented in FIGURE 3b, with the main channel modulated nearly 100%. In this case, if the subcarrier wave were separated from the main channel its effect upon the frequency deviation would be as indicated in FIGURE 3c. From a consideration of the graphs of FIGURES 2 and 3, it will be seen that by controlling the amplitude of the subcarrier signal prior to its application to the main carrier or mixing with the main signal modulation, the subcarrier can be permitted to more effectively modulate the main carrier and provide increased power output and improved signal-to-noise ratio on the subcarrier channel. The manner in which it does this is further illustrated by the graphs shown in FIGURE 4 to which attention is now directed.

In FIGURE 4a the dotted-line positive half-wave curves 67 and 68, in conjunction with the full-line negative half-wave curves 69 and 70, may be taken to represent the main-channel wave form of the modulating signal between the output lead 17 and system ground, for example, at the point (W) in the system of FIGURE 1, when modulation is applied to the input circuits 12 and 13. After full-wave rectification in the circuit 50, the resultant signal output is represented by the solid-line curve comprising the two half-wave curves 69 and 70 and the corresponding half wave curve 67' and 68' in FIGURE 4*a*. This represents the signal output at the point ($x$) in the system, on the circuit lead 58, for example, and is thus the signal applied to the AM modulator for modulating the subcarrier wave prior to its application to the main carrier modulator, or addition in the circuits 25, with the main modulating signal.

The subcarrier wave 64 is then controlled in amplitude, or modulated, as indicated in the graph of FIGURE 4*b* which represents the output signal at the circuit 33, or at the point ($y$) in the system. When this signal is added to the main-channel modulating signal from the circuit lead 27, the resultant composite modulation signal for the main carrier wave is provided and may be represented by the graph shown in FIGURE 4*c*. This is, therefore, the signal characteristic as the modulation signal input circuit 44 and at the point ($z$) in the system.

With this improved modulation of the subcarrier signal in a multiplex FM system, the mean power transmitted on the subcarrier wave is thus increased whenever the amplitude of the modulation on the main channel is reduced, and this gives a greatly increased mean power output on the subcarrier, and an increase or improvement in the signal-to-noise ratio at the receiver. A standard multiplex receiver may be used for receiving this signal, preferably with good limiting on the subcarrier signal.

An alternative to the amplitude modulation of the subcarrier with the wave form shown in FIGURE 4*b* can be obtained by the use of "dynamic" control means which controls the amplitude of the subcarrier wave according to the mean or average level of the signal in the main modulating channel. This alternative is particularly adapted to control a subcarrier signal whose program material is not necessarily stereophonically related to the main-channel program material. It is also adapted for reducing the possibility of cross talk into subcarrier program material, or from the subcarrier wave channel into other subcarrier wave channels or into the main channel.

Figure 5:
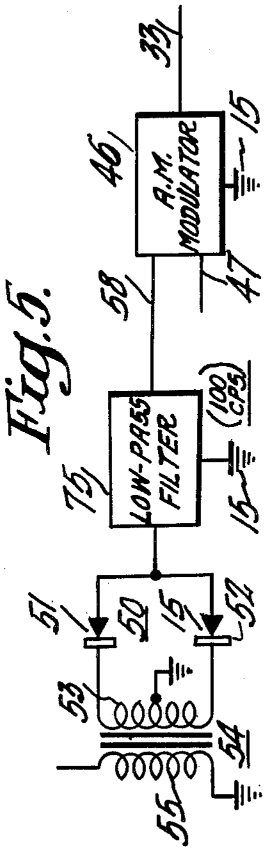
FIGURE 5 is a further schematic circuit diagram of a portion of the circuit of FIGURE 1, showing a modification thereof in accordance with the invention.
Figure 6:
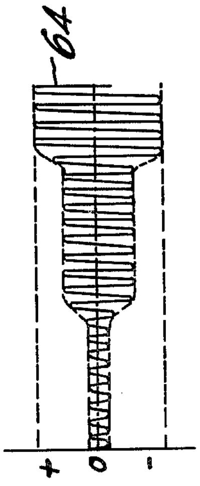
FIGURE 6 is a further graph showing a frequency-response curve illustrating an operating characteristic of the system as provided by the modified circuit of FIGURE 5.

Referring to FIGURES 5 and 6, this alternative arrangement may be provided in one form by introducing a suitable lowpass filter 75 in circuit between the rectifier circuit 50 and the AM modulator 46 in the circuit lead 58, the filter 75 having common ground return circuit connection with the system as indicated. With this arrangement, the modulating signal at the point ($y$) in the system of FIGURE 1 is changed from that as represented in FIGURE 4*b*, for example, to that as represented by the graph in FIGURE 6. The latter shows the amplitude control of the subcarrier wave 64 in accordance with the mean or average amplitude of the main-channel modulating signal at the point ($x$). As the main channel modulating signal is reduced in amplitude, the control of the deviation of the main carried by the subcarrier signal is increased as indicated. Otherwise the system of FIGURE 5 is the same as that of FIGURE 1. By way of example, the low-pass filter 75 may be designed to pass signals of 100 cycles per second and below. Also it may be pointed out that the delay network 46 provides a delay in the main modulating ($A+B$) modulating signal corresponding to that for the sub-carrier signal through the FM modulator 21 and the AM modulator 46.

From the foregoing, it will be seen that by controlling the amplitude of the subcarrier signal or wave according to either the mean or the instantaneous amplitude of the modulating signal in the main channel, more effective use may be made of the subcarrier in modulating the main carrier wave and providing increased or improved signal-to-noise ratio at the receiver especially during the quiet passages, that is, periods of low modulation, of the main channel signal. This modulating system thus permits the subcarrier signal to increase in amplitude and strength and is particularly adapted for use in stereophonic multiplex frequency-modulation signal transmission systems. Furthermore only slight restriction of the main channel modulation is required to permit effective transmission of the subcarrier signal during maximum amplitude excursions of the main signal. In the present system, therefore, the subcarrier signal can be transmitted without appreciably restricting the main channel, which is a distinct advantage.

What is claimed is:

1. In a multiplex-frequency-modulation signal transmitter, the combination with a main-channel modulating signal circuit and a subcarrier signal circuit both connected in common with a modulator circuit for a main carrier wave, of amplitude-modulator means connected with said subcarrier signal circuit for amplitude modulating the signal flow therethrough in response to an applied modulating signal, means for deriving said modulating signal from said main-channel modulating signal circuit as a function of signal amplitude variation therein, and means for applying said derived modulating signal to said amplitude-modulator means.

2. In a signal transmission system, the combination with a main-channel modulating signal circuit and a subcarrier signal circuit both connected in common with a main carrier-wave modulator for multiplex frequency-modulation operation, of means for controlling the amplitude of the subcarrier signal in said subcarrier signal circuit in response to variations in an applied control signal, means for deriving said control signal as a function of signal amplitude variation in the main-channel modulating signal circuit, and means for applying said derived control signal to said subcarrier signal amplitude-controlling means for controlling the amplitude of the subcarrier signal and the mean power transmitted thereon.

3. In a multiplex frequency-modulation signal transmitter, the combination with a main-channel modulating signal circuit and main carrier-wave frequency-modulator means coupled thereto, of means for deriving a frequency-modulated subcarrier signal, circuit means coupling said last-named means with said modulator means for applying multiplex frequency modulation to the main carrier wave of said transmitter, and means for controlling the amplitude of the subcarrier signal and the multiplex frequency modulation in accordance with variations in the signal amplitude in the main-channel modulating signal circuit, thereby to increase the mean power transmission and the signal-to-noise ratio on the subcarrier signal.

4. In a multiplex frequency-modulation signal transmitter, the combination with a main-channel modulating signal circuit and main carrier-wave frequency-modulator means coupled thereto, of means for deriving a frequency-modulated subcarrier signal, a signal translating circuit coupling said last named means with said modulator means for applying multiplex frequency modulation to the main carrier wave of said transmitter, amplitude modulator means in said signal translating circuit for controlling the amplitude of the subcarrier signal and the multiplex frequency modulation, and means connected with said modulator means for modulating said subcarrier signal in accordance with variations in the signal amplitude in the main-channel modulating signal circuit, thereby to increase the mean power transmitted on the subcarrier signal and the signal-to-noise ratio of the received multiplexed signal therefrom.

5. In a multiplex frequency-modulation signal transmitter, the combination with a main carrier-wave source and frequency-modulator means therefor, of means for applying a main modulating signal to said modulator means including a first signal-translating circuit, means including a second signal-translating circuit for applying a frequency-modulated subcarrier signal to said modulator means for composite multiplex frequency-modulation of a main carrier wave from said source, amplitude-modulator means connected with said last-named circuit for amplitude modulating the frequency-modulated subcarrier signal translated therethrough, and means for deriving a modulating signal for said amplitude-modulator means from said main-channel modulating signal circuit which is a function of signal amplitude variations therein, whereby the mean power transmitted on the subcarrier signal is increased and the signal-to-noise ratio of the received signal is improved.

6. In a multiplex frequency-modulation signal transmitter, the combination with a main carrier-wave source and frequency modulator means therefor, of means for applying a main modulating signal to said modulator means including a first signal translating circuit, means including a second signal-translating circuit for applying a frequency-modulated subcarrier signal to said modulator means for composite multiplex frequency modulation of a main carrier signal from said source, amplitude-modulator means connected with said last-named circuit for amplitude modulating the frequency-modulated subcarrier signal translated therethrough, and means for deriving an amplitude-modulating signal for said amplitude-modulator means from said main-channel modulating signal circuit to control the amplitude of the subcarrier signal in accordance with variations in the level of the main modulating signal.

7. In a multiplex frequency-modulation transmitter, the combination with a main-channel modulating signal circuit and a subcarrier signal circuit terminating in a modulator circuit for a main carrier wave, the signal in said subcarrier signal circuit producing modulation effects on said main carrier-wave, of means for deriving an electrical control signal for the subcarrier signal circuit from the main-channel modulating signal circuit as a function of the signal translation therethrough, and means for applying said control signal to the subcarrier signal circuit to amplitude-modulate and control the modulation effect of the subcarrier signal on the main-channel frequency modulation thereby to improve subcarrier signal transmission and reception.

8. In a stereophonic multiplex frequency-modulation transmitter, the combination with a main-channel modulating signal circuit and a subcarrier signal circuit terminating in a modulator circuit for a main carrier wave, of means for deriving an electrical control signal for the subcarrier signal circuit from the main-channel modulating signal circuit as a function of the signal translation therethrough, amplitude-modulator means for applying said control signal to the subcarrier signal circuit to amplitude-modulate and control the modulation effect of the subcarrier signal on the main-channel frequency modulation, and means for applying stereophonically-related signals to said first and second named circuits.

9. In a multiplex frequency-modulation signal transmission system, the combination with a main-channel modulating signal circuit and a subcarrier modulating signal circuit both connected in common with a main carrier-wave modulator for applying modulating signals from said circuits additively to said modulator for multiplex frequency-modulation of a main carrier wave, of amplitude-modulator means for controlling the amplitude of the subcarrier signal in said subcarrier signal circuit in response to variations in an applied modulating signal, means including a rectifier circuit and a low-pass filter connected therewith as an output signal-translating element for deriving said modulating signal as a function of the mean signal level in the main-channel modulating signal circuit, and means for applying said derived modulating signal to said subcarrier amplitude-modulator means for controlling the amplitude of the subcarrier signal and the mean power transmitted thereon.

10. In a multiplex frequency-modulation signal transmitter, the combination with main carrier-wave frequency-modulator means, of means for applying a main modulating signal to said modulator means including a first signal-translating circuit, means including a second signal-translating circuit for applying a frequency-modulated subcarrier modulating signal to said modulator means, amplitude-modulator means connected with said last-named circuit for amplitude modulating the frequency-modulated subcarrier signal translated therethrough, means including a signal rectifier and a low-pass output filter therefor for deriving a modulating signal for said amplitude-modulator means from said main-channel modulating signal circuit, and means for applying input modulating signals to said first and second signal-translating circuits in unison.

11. A signal translating system comprising means providing a pair of signals, means providing a source of subcarrier wave energy, means for frequency modulating said subcarrier wave energy as a function of one of said signals and amplitude modulating said subcarrier wave energy as a function of the amplitude of the other of signals, means providing a source of main carrier wave energy, and means for frequency modulating said main carrier wave energy with said other signal and said frequency and amplitude modulated subcarrier wave.

References Cited in the file of this patent

UNITED STATES PATENTS

| | | |
|---|---|---|
| 2,378,298 | Hilferty | June 12, 1945 |
| 2,779,020 | Wilmotte | Jan. 24, 1950 |
| 2,912,492 | Haantjes et al. | Nov. 10, 1959 |
| 3,068,475 | Avins | Dec. 11, 1962 |
| 3,069,679 | Sweeney et al. | Dec. 18, 1962 |

OTHER REFERENCES

Holt: RCA TN No. 345, Technical Notes, November 1959.